(No Model.)
G. W. CROSS.
VEHICLE TIRE.
No. 601,826. Patented Apr. 5, 1898.
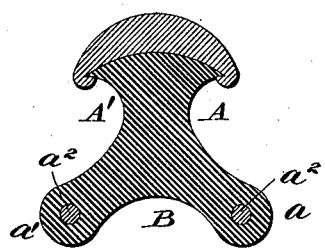
Witnesses:
Inventor
George W. Cross
By Rich N. Dyer
Att'y.
THE NORRIS PETERS CO., PHOTO-LITHO., WASHINGTON, D. C.

UNITED STATES PATENT OFFICE.

GEORGE W. CROSS, OF PITTSTON, PENNSYLVANIA.

VEHICLE-TIRE.

SPECIFICATION forming part of Letters Patent No. 601,826, dated April 5, 1898.

Application filed June 12, 1897. Serial No. 640,409. (No model.)

*To all whom it may concern:*

Be it known that I, GEORGE W. CROSS, a citizen of the United States, residing at Pittston, in the county of Luzerne and State of Pennsylvania, have invented a certain new and useful Improvement in Vehicle-Tires, of which the following is a specification.

The object of the present invention is to provide a tire for vehicles—such as bicycles, road-wagons, &c.—which shall possess the requisite degree of resiliency and at the same time decrease the possibility of side slip.

A further object is to provide a tire of great durability, simplicity, and consequent cheapness of manufacture.

A further object is to provide a tire which shall necessitate less attention on the part of the user and less repairing than those commonly in use.

To these ends I provide in one embodiment of my invention a tire, either solid or hollow, with annular recesses or concavities either upon the sides of such tire or upon the periphery, or both, and combined with a metallic spring or springs embedded therein. These concavities or recesses being in effect cut-away portions permit those portions of the tire extending outwardly beyond them to be displaced under the weight of the vehicle in such manner as to afford the requisite amount of spring or resiliency and by reason of the firm bearing of the tire upon the ground preventing a side slip of the wheel.

The invention is illustrated in the accompanying drawing, which shows a sectional view of a vehicle-tire embodying my improvements.

Characterizing generally the structures thus shown, it may be remarked that the invention is independent of particular means for securing the tires to the fellies or rims of the wheels. I have illustrated in the drawing conventional means for so securing the tires, consisting of cementing the inner surface of the tire to the concave surface of the rim. This may be varied as desired.

Referring to the drawing, it will be seen that the tire is provided upon either side with an annular recess or cut-away portion A A', beyond which, toward the periphery of the tire, extend projections $a\ a'$. In a tire so constructed the projections $a\ a'$ will, when weight is applied, whether such application be in a perpendicular or in an oblique direction, be pressed upwardly, so as to afford yielding contact with the ground and a high degree of resiliency. This effect may, if desired, be increased by the addition of a peripheral annular groove or recess B. In a tire so constructed the freedom of upward movement of the projecting portions $a\ a'$ is greater. Such portions $a\ a'$ will, when weight is applied in an approximately perpendicular direction, expand both upwardly and outwardly.

In the outwardly-extending portions $a\ a'$ are placed wires $a^2$, preferably of spring-steel and passing through continuous perforations in the tire. The ends of these wires are joined, so as to make them continuous rings. They may be so fashioned and of such quality as to resist the tendency of the portions $a\ a'$ to be displaced under the application of weight and to insure quick return to normal position of that portion of the tire which has borne the weight, and thereby been pressed into abnormal position. The addition of these will add to the resiliency of the tire.

I claim—

1. A vehicle-tire having an annular recess and side recesses, and a spring or springs embedded in said tire, substantially as set forth.

2. A vehicle-tire having an annular recess or recesses, and two parallel springs embedded in said tire, substantially as set forth.

This specification signed and witnessed this 10th day of June, 1897.

GEORGE W. CROSS.

Witnesses:
S. O. EDMONDS,
JNO. R. TAYLOR.